United States Patent
Yee et al.

(10) Patent No.: US 7,098,983 B2
(45) Date of Patent: Aug. 29, 2006

(54) ARRAY SUBSTRATE FOR A LIQUID CRYSTAL DISPLAY DEVICE AND MANUFACTURING METHOD FOR THE SAME

(75) Inventors: Han-Su Yee, Daegu (KR); Young-Hun Ha, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 392 days.

(21) Appl. No.: 10/032,057

(22) Filed: Dec. 31, 2001

(65) Prior Publication Data

US 2002/0171782 A1 Nov. 21, 2002

(30) Foreign Application Priority Data

May 21, 2001 (KR) ............................... 2001-27613

(51) Int. Cl.
*G02F 1/1343* (2006.01)

(52) U.S. Cl. ..................... 349/147; 349/139; 349/142; 349/147

(58) Field of Classification Search ................. 349/43, 349/139, 142, 147; 257/448, 773
See application file for complete search history.

(56) References Cited

U.S. PATENT DOCUMENTS

| 5,334,860 | A | * | 8/1994 | Naito | 257/59 |
| 5,790,222 | A | * | 8/1998 | Kim | 349/139 |
| 5,828,433 | A | * | 10/1998 | Shin | 349/147 |
| 5,894,136 | A | * | 4/1999 | Wook | 257/59 |

* cited by examiner

*Primary Examiner*—Kenneth Parker
*Assistant Examiner*—Matthew E. Warren
(74) *Attorney, Agent, or Firm*—Morgan, Lewis & Bockius, LLP

(57) ABSTRACT

An array substrate for a liquid crystal display device includes a gate line, a data line including a first data line having a first width and a second data line having a second width overlying the first data line, the second width is larger than the first width, a pixel electrode in a pixel region and defined by a crossing of the gate line and the data line, the pixel electrode being formed during a same process as the second data line, and a thin film transistor connected to the pixel electrode.

9 Claims, 8 Drawing Sheets

ARRAY SUBSTRATE FOR A LIQUID CRYSTAL DISPLAY DEVICE AND MANUFACTURING METHOD FOR THE SAME

This application claims the benefit of Korean Patent Application No. 2001-27613, filed on May 21, 2001 in Korea, which is hereby incorporated by reference.

BACKGROUND OF THE INVENTION

1. Field of the Invention

The present invention relates to a liquid crystal display device, and more particularly, to an array substrate for a liquid crystal display device and a manufacturing method of the array substrate for the liquid crystal display device.

2. Discussion of the Related Art

Generally, a liquid crystal display device includes a lower substrate, commonly referred to as an array substrate, that includes a thin film transistor, and an upper substrate, commonly referred to as a color filter substrate, that includes a color filter, and a liquid crystal material interposed between the upper substrate and the lower substrate. The liquid crystal display device makes use of optical anisotropy and polarization properties of the liquid crystal material to display images. Presently, active matrix LCD (AM LCD) devices are one of the most popular means for displaying images because of their high resolution and superiority in displaying moving images.

FIG. 1 is a cross-sectional view of a liquid crystal panel according to the related art. In FIG. 1, a liquid crystal panel 20 includes an upper substrate 4 and a lower substrate 2. The upper substrate 4 and the lower substrate 2 are spaced apart from each other with a liquid crystal material layer 10 interposed therebetween. The upper substrate 4 includes a color filter 8 to display color images, and the lower substrate 2 includes a switching element to change an alignment orientation of liquid crystal molecules of the liquid crystal material layer 10. The upper substrate 4 includes a black matrix 9 that is formed beneath a transparent substrate 1 to intercept light in a region other than a pixel region P. A color filter 8, which has sub-color-filters red (R), green (G), and blue (B) in a repetitious order, is formed under the black matrix 9 to display color images by transmitting only the light of particular wavelength range. A common electrode 12 is formed beneath the color filter 8 to apply a voltage to the liquid crystal material layer 10. A switching element, thin film transistor "T," is formed on a transparent substrate 1 of the lower substrate 2. A pixel electrode 14, which receives a signal from the thin film transistor "T" and applies a voltage to the liquid crystal material layer 10, is formed on the lower substrate 2 within the pixel region P. An alignment layer (not shown) is formed on interior surfaces of the common and pixel electrodes 12 and 14 to align the liquid crystal molecules along a uniform direction.

FIG. 2 is a flow chart showing a photolithographic masking process for a liquid crystal display device according to the related art. The photolithographic masking process uses a photoresist material that undergoes a chemical reaction when exposed to light. Specifically, the photoresist material is coated on a substrate, and then a desired photoresist pattern is obtained by irradiating light onto the coated photoresist material layer using a mask. The mask includes a plurality of light block portions and a plurality of light transmission portions. The photoresist material can be classified into two types: a positive photoresist material and a negative photoresist material. When the positive photoresist material is used, a portion of the photoresist material that is exposed to light is removed during a subsequent development process. The positive photoresist material is commonly used for forming the black matrix and array elements, and the negative photoresist material is commonly used for patterning the color filter.

In FIG. 2, the photolithographic masking process includes a first step ST1 that is a photoresist coating process. During the first step ST1, a spin coating method is used to form a flat and uniform photoresist layer. During a second step ST2, a soft baking process for hardening the coated photoresist is performed. A third step ST3, includes a exposure process. During the third step ST3, the mask, which has mask patterns on a transparent substrate, is positioned over the coated photoresist material layer, and the coated photoresist material layer is exposed to light of a masking and exposure apparatus. A fourth step ST4 includes a development process. During the fourth step ST4, a particular portion of the photoresist layer is removed using a developer. During a fifth step ST5, a hard baking process is performed for improving a contact property between the coated photoresist material layer and a corresponding underlayer.

During the third step ST3, since the light exposure is performed in a way to transcribe a desired pattern onto the photoresist material layer using the masking and exposure apparatus that uses lens and mirrors to direct the light, a pattern distortion phenomenon, which is caused by the lens and mirrors of the light exposing apparatus, cannot be accurately controlled. For example, if a first pattern is distorted and a second pattern is to be formed on the basis of the first pattern, then the second pattern may be formed in a region displaced from a desired point. Accordingly, an overlay accuracy between the first and second patterns is decreased, and corresponding overlay differences increase as a number of subsequent processes are added. Moreover, if the overlay differences between the pixel region and an adjacent line increases, display quality of the images decreases.

FIG. 3 is a plan view illustrating a partial array substrate of a liquid crystal display device according to the related art. In FIG. 3, a horizontal gate line 32, which includes a gate electrode 30 and a capacitor electrode 31, is formed on an array substrate. A vertical data line 44, which includes a source electrode 40, crosses the gate line 32, thereby defining a pixel region. A drain electrode 42 is spaced apart from the source electrode 40. The gate electrode 30, the source electrode 40, and the drain electrode 42 constitute a thin film transistor T. A pixel electrode 50, which is connected to the thin film transistor T, is formed in the pixel region. The gate line 32 applies a scan signal to the pixel electrode 50, and the data line 44 applies a data signal to the pixel electrode 50. There may exist a parasitic capacitance, i.e., a coupling capacitance, between the data line 44 and an adjacent pixel electrode 50. Accordingly, if the parasitic capacitance value is different in each pixel region, then a deterioration of displayed images, such as a spot on the screen, may occur. The capacitance can be expressed numerically as follows:

$$C = \in (A/d) \tag{1}$$

where "C" is a capacitance, "∈" is a dielectric constant of insulator, "A" is an area of an electrode and "d" is a distance between electrodes. Accordingly, since a distance between the data line 44 and the pixel electrode 50 affects the coupling capacitance value, it is necessary to maintain a uniform distance between the data line 44 and the pixel electrode 50 to maintain the quality of the displayed images.

FIGS. 4A to 4C are cross-sectional views taken along A—A, B—B of FIG. 3, and illustrating a fabrication process for an array substrate according to the related art.

In FIG. 4A, a thin film transistor "T" and a data line 44 are formed on a transparent substrate 1. A gate electrode 30 is formed on the transparent substrate 1, and a gate insulating layer 34 is formed on the gate electrode 30 and on the substrate 1. An active layer 36a is formed by depositing amorphous silicon (a-Si) on the gate insulating layer 34, and an ohmic contact layer 36b is formed by depositing doped amorphous silicon on the active layer 36a. The active layer 36a and the ohmic contact layer 36b constitute a semiconductor layer 36. A source electrode 40 and a drain electrode 42, which is spaced apart from the source electrode 40, are formed on the semiconductor layer 36. A channel ch is formed between the source electrode 40 and the drain electrode 42 by removing a portion of the ohmic contact layer 36b between the source electrode 40 and the drain electrode 42, thereby exposing the active layer 36a between the source electrode 40 and the drain electrode 42. The gate electrode 30, the semiconductor layer 36, the source electrode 40, the drain electrode 42 and the channel ch constitute the thin film transistor T. The data line 44 is formed simultaneously with a forming process of the source electrode 40 and the drain electrode 42.

In FIG. 4B, a passivation layer 46 is formed on the thin film transistor T and on the data line 44 to protect the thin film transistor T. A drain contact hole 48 is formed through the passivation layer 46 to expose a portion of the drain electrode 42.

In FIG. 4C, pixel electrodes 50, which include a transparent conductive material, are formed on the passivation layer 46. The pixel electrodes 50 contact the corresponding drain electrodes 42 through the drain contact holes 48. The pixel electrodes 50 are uniformly positioned on both sides of the data line 44 by a distance "a" between the data line 44 and the pixel electrode 50 on the left side, and a distance "b" between the data line 44 and the pixel electrode 50 on the right side. However, during the photolithographic masking process, pattern distortion occurs.

FIG. 5 is a cross-sectional view illustrating an array substrate for a liquid crystal display device according to the related art. In FIG. 5, since a distance "a" between the data line 52 and the pixel electrode 54 on the left side is smaller than a distance "b" between the data line 52 and the pixel electrode 54 on the right side, the coupling capacitance of each region between the data line 52 and the pixel electrode 54 is different, whereby a voltage that is applied to each pixel electrode is different. Accordingly, if the voltage applied to each pixel is different, an alignment orientation of the liquid crystal material cannot be uniformly controlled. Thus, the quality of the displayed images deteriorates. Moreover, since a rework of the photolithographic masking process is necessary to prevent deterioration of the displayed images, processing time increases and production yields decrease.

SUMMARY OF THE INVENTION

Accordingly, the present invention is directed to an array substrate of a liquid crystal display device and a manufacturing method for the array substrate of the liquid crystal display device that substantially obviates one or more of problems due to limitations and disadvantages of the related art.

An object of the present invention is to provide an array substrate for a liquid crystal display device in which a data line consists of a first data line and a second data line and the second data line is formed simultaneously with a pixel electrode in a same process.

Another object of the present invention is to provide a manufacturing method of an array substrate for a liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a gate line, a data line including a first data line having a first width and a second data line having a second width overlying the first data line, the second width is larger than the first width, a pixel electrode in a pixel region and defined by a crossing of the gate line and the data line, the pixel electrode being formed during a same process as the second data line, and a thin film transistor connected to the pixel electrode.

In another aspect, a manufacturing method of an array substrate for a liquid crystal display device includes forming a gate line on a transparent substrate, the gate line includes a gate electrode, forming a gate insulating layer and a semiconductor layer over the gate line, forming a first data line having a first width and a drain electrode on the gate insulating layer and on the semiconductor layer, the first data line includes a first source electrode that crosses the gate line, forming a passivation layer on the first source electrode, the first data line and the drain electrode, the passivation layer includes a drain contact hole and a data contact hole, and forming a pixel electrode, a second data line having a second width and a second source electrode, the pixel electrode connected to the drain electrode through the drain contact hole, and the second data line connected to the first data line and the first source electrode through the data contact hole.

In another aspect, a manufacturing method of an array substrate for a liquid crystal display device includes forming a gate line, forming a data line including a first data line having a first width and a second data line having a second width larger than the first width, forming a pixel electrode in a pixel region defined by a crossing of the gate line and the data line, and forming a thin film transistor connected to the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, which is illustrated in the accompanying drawings.

Figure 1:
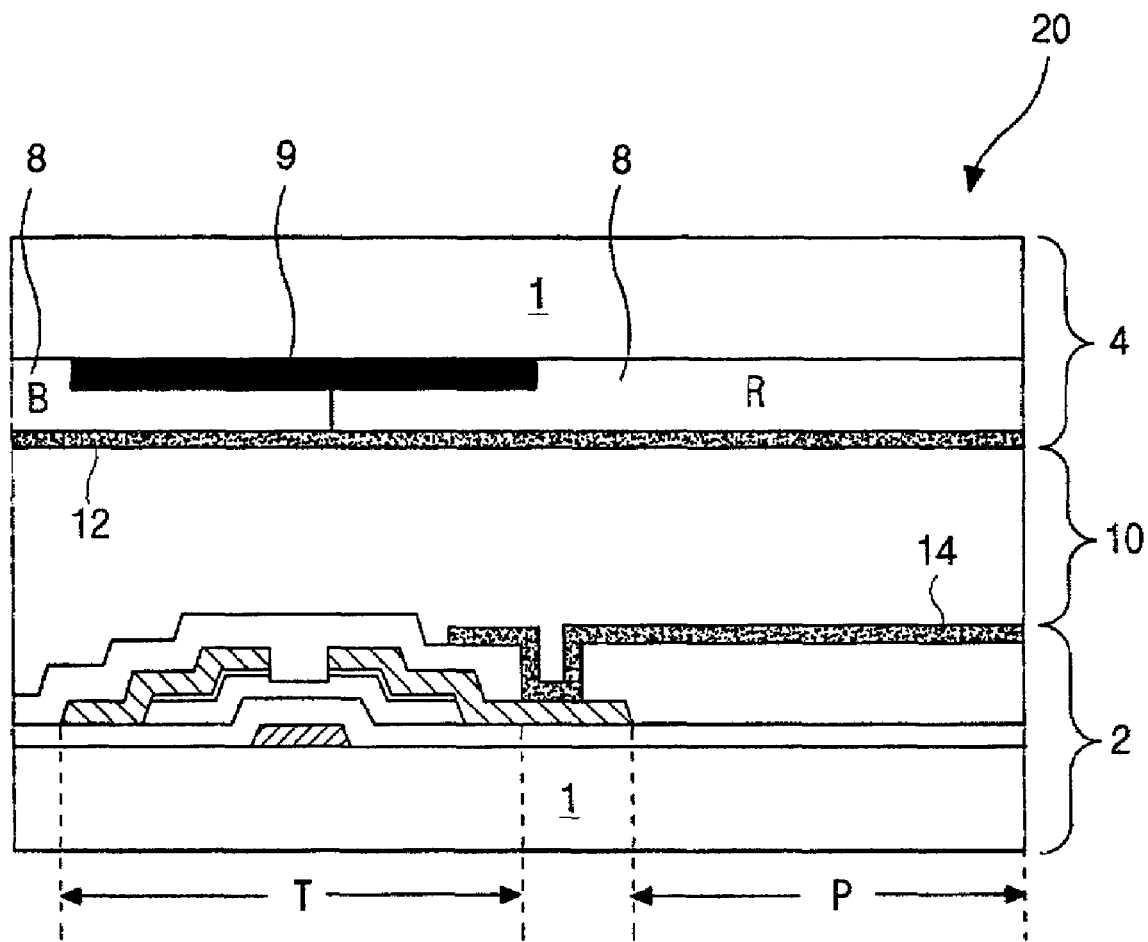
FIG. 1 is a cross-sectional view of a liquid crystal panel for a liquid crystal display device according to the related art.
Figure 2:
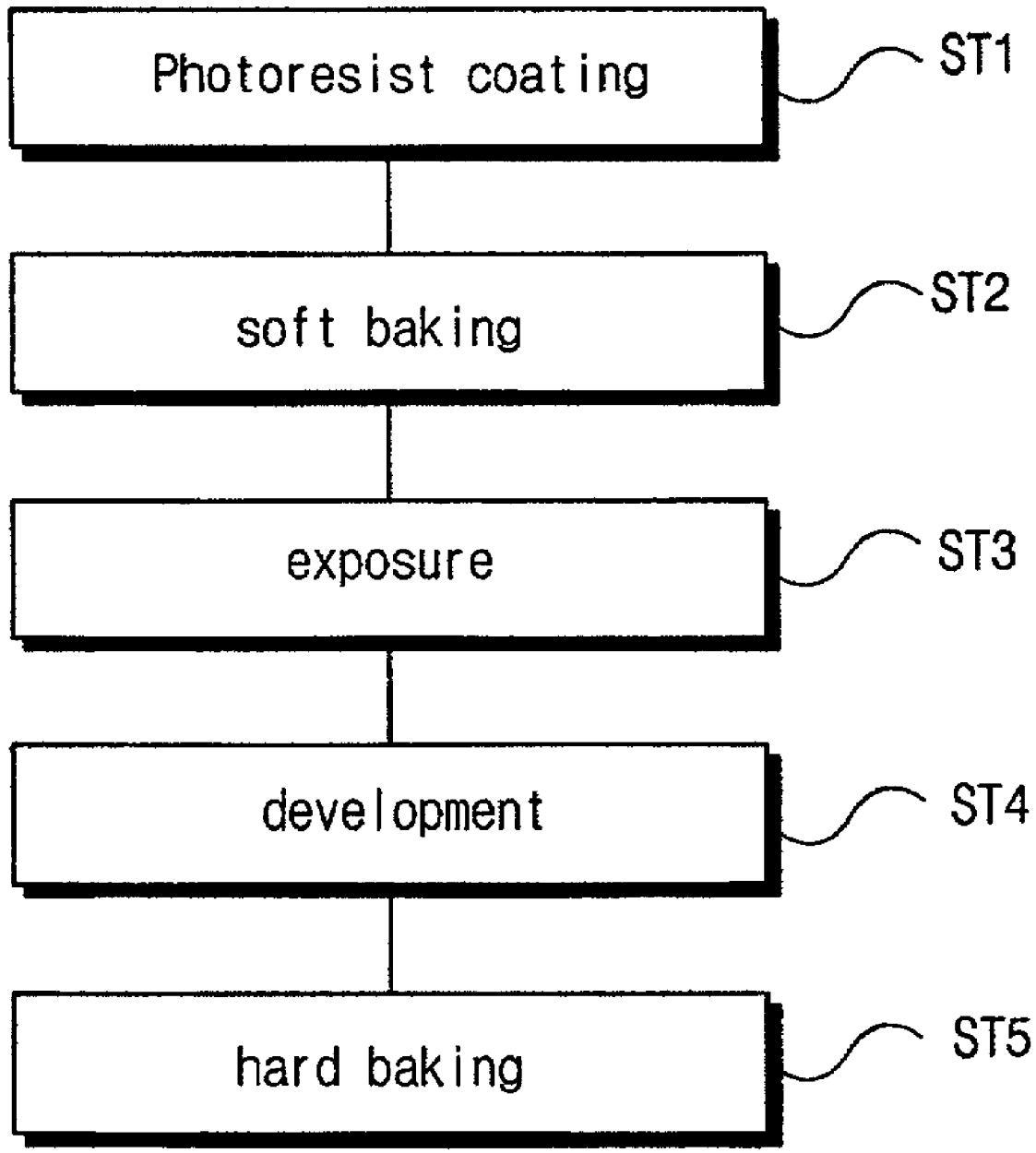
FIG. 2 is a flow chart showing a photolithographic masking process for a liquid crystal display device according to the related art.
Figure 3:
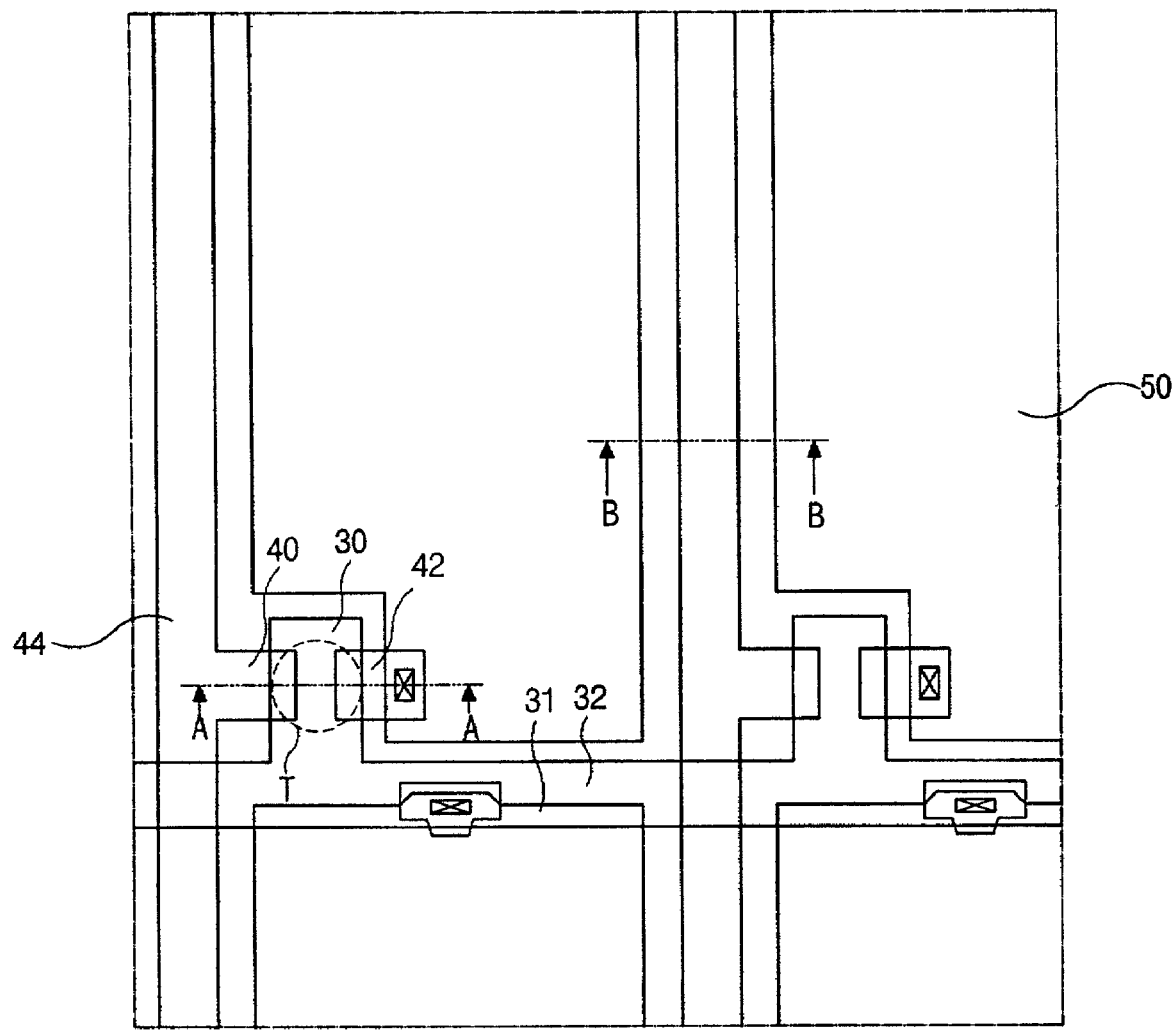
FIG. 3 is a plan view illustrating a partial array substrate for a liquid crystal display device according to the related art.
Figure 4A:
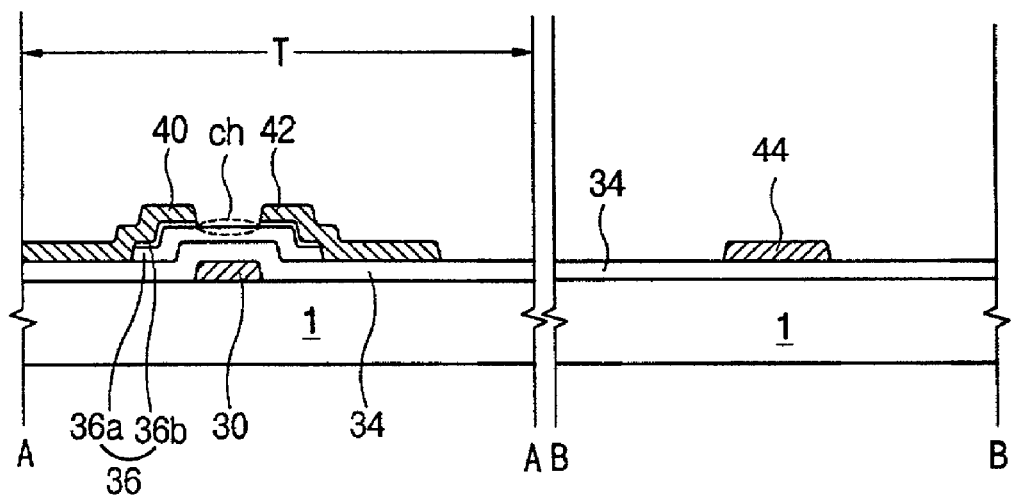
FIGS. 4A to 4C are cross-sectional views taken along A—A, B—B of FIG. 3, and illustrating a fabrication process for an array substrate according to the related art.
Figure 4B:
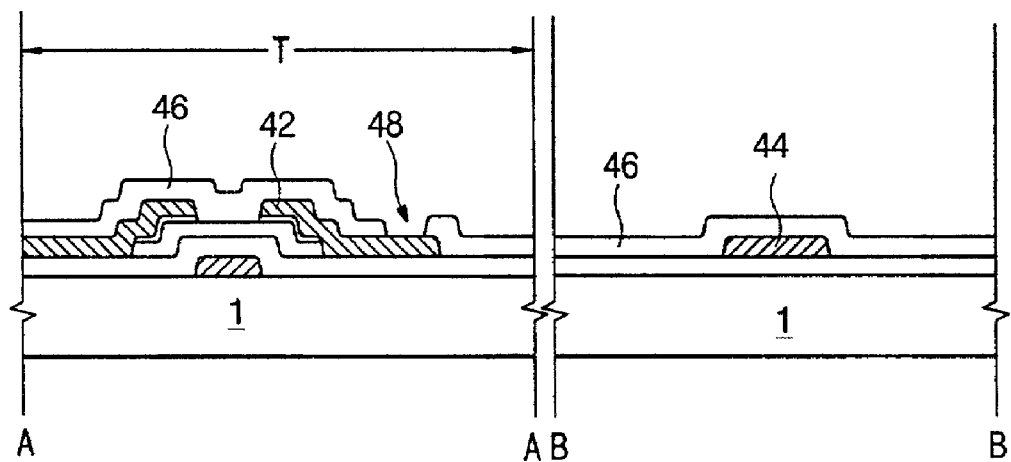
Figure 4C:
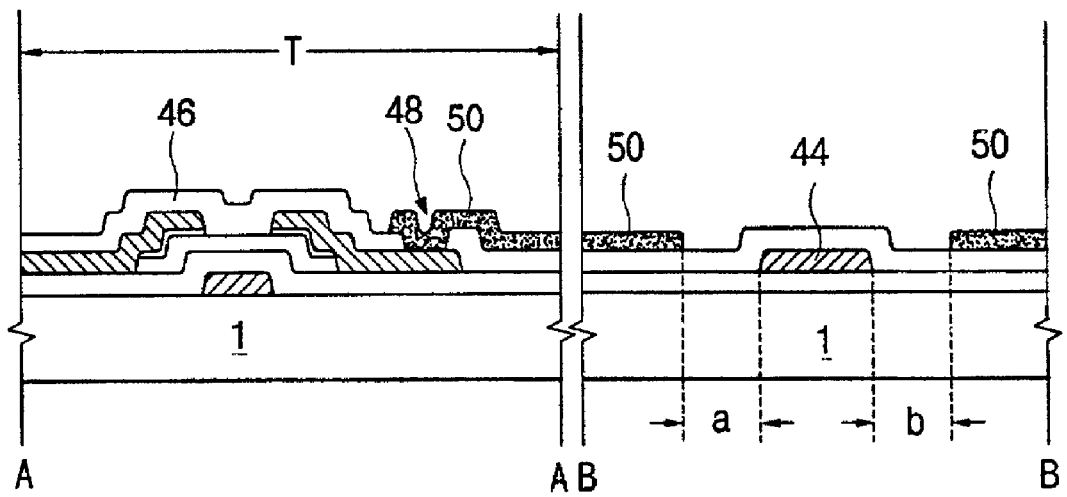
Figure 5:
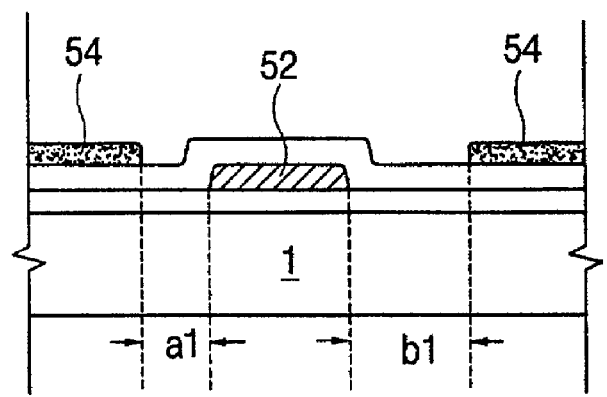
FIG. 5 is a cross-sectional view illustrating an array substrate for a liquid crystal display device that has a different overlay between a pixel electrode and a data line according to the related art.
Figure 6:
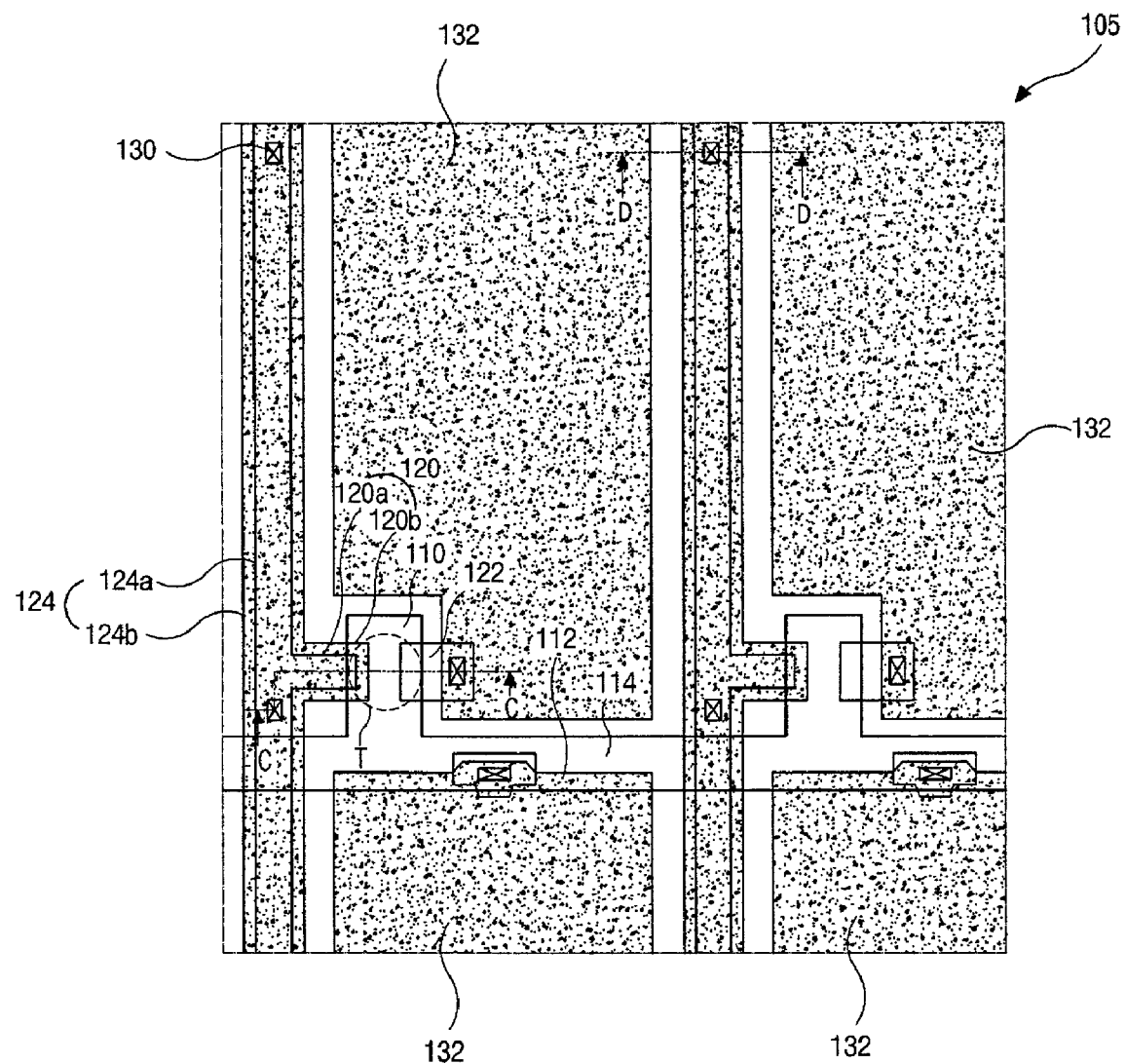
FIG. 6 is a plan view illustrating a partial exemplary array substrate for a liquid crystal display device according to the present invention.

FIG. 6 is a plan view illustrating a partial exemplary array substrate for a liquid crystal display device according to the present invention. In FIG. 6, a gate line 114 may be formed horizontally on an array substrate 105 and a data line 124 may be formed vertically on the array substrate 105. The gate line 114 may include a gate electrode 110 and a capacitance electrode 112, and the data line 124 may include a source electrode 120. The data line 124 crosses the gate line 114 defining a pixel region. The data line 124 may include a first data line 124a and a second data line 124b. The second data line 124b may have a width larger than a width of the first data line 124a, and may overlap the first data line 124a. Accordingly, since the data line 124 includes a double layer structure comprising the first data line 124a and the second data line 124b, when one of the first data line 124a or the second data line 124b may be interrupted, the other one of the first or second data lines 124a or 124b can serve as a repair line. Accordingly, additional repair processes can be omitted. An insulating layer (not shown) may be interposed between the first data line 124a and the second data line 124b, and a plurality of data contact holes 130 may be formed on the insulating layer. The data contact hole 130 may electrically contact the first data line 124a and the second data line 124b. A drain electrode 122 may be formed spaced apart from the source electrode 120. A pixel electrode 132 may be connected to the thin film transistor T. The source electrode 120 may include a first source electrode 120a and a second source electrode 120b. The first source electrode 120a and the second source electrode 120b may be connected to the first data line 124a and the second data line 124b, respectively. The pixel electrode 132, the second data line 124b, and the second source electrode 120b may be simultaneously formed of a transparent conductive material, such as indium tin oxide (ITO), for example, during a process step.

Figure 7A:
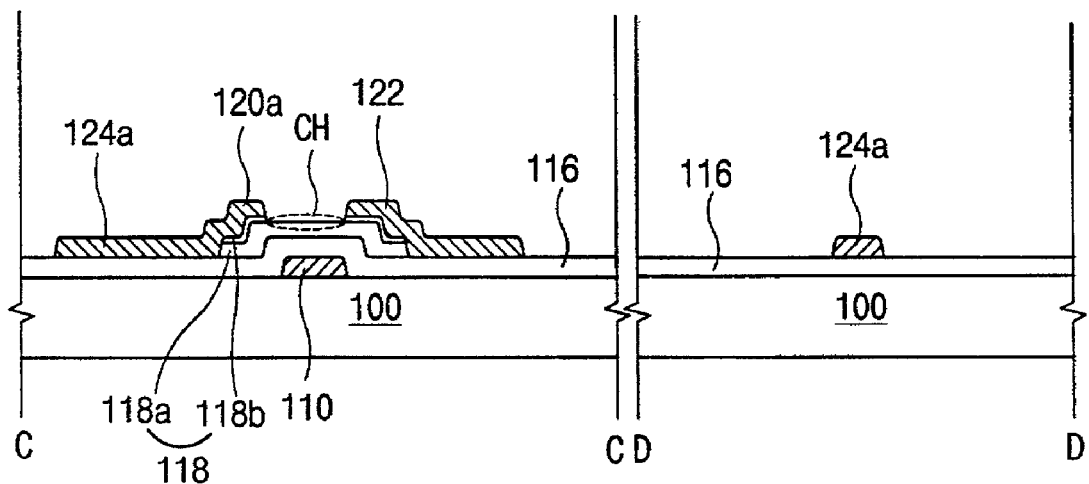
FIGS. 7A to 7C are cross-sectional views taken along C—C, D—D of FIG. 6, and illustrating an exemplary fabrication process for an array substrate according to the present invention.
Figure 7B:
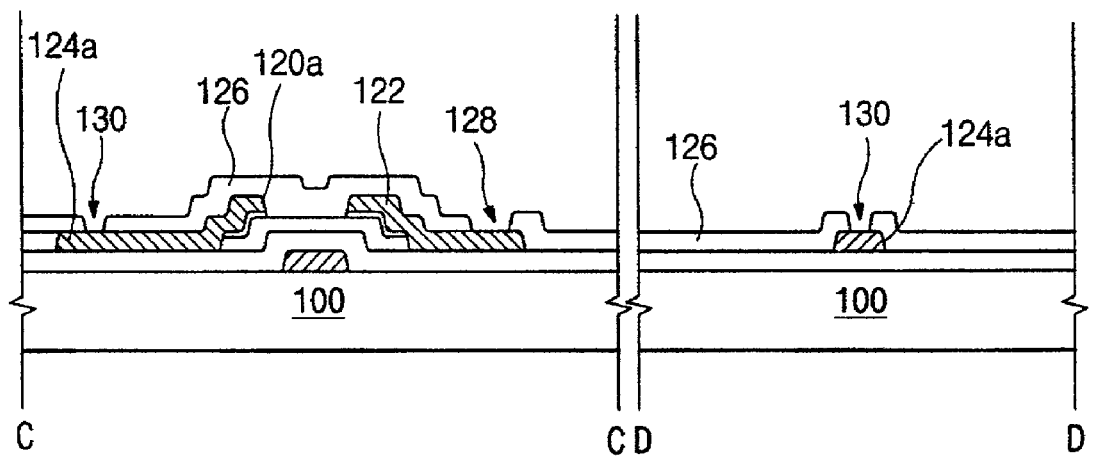
Figure 7C:
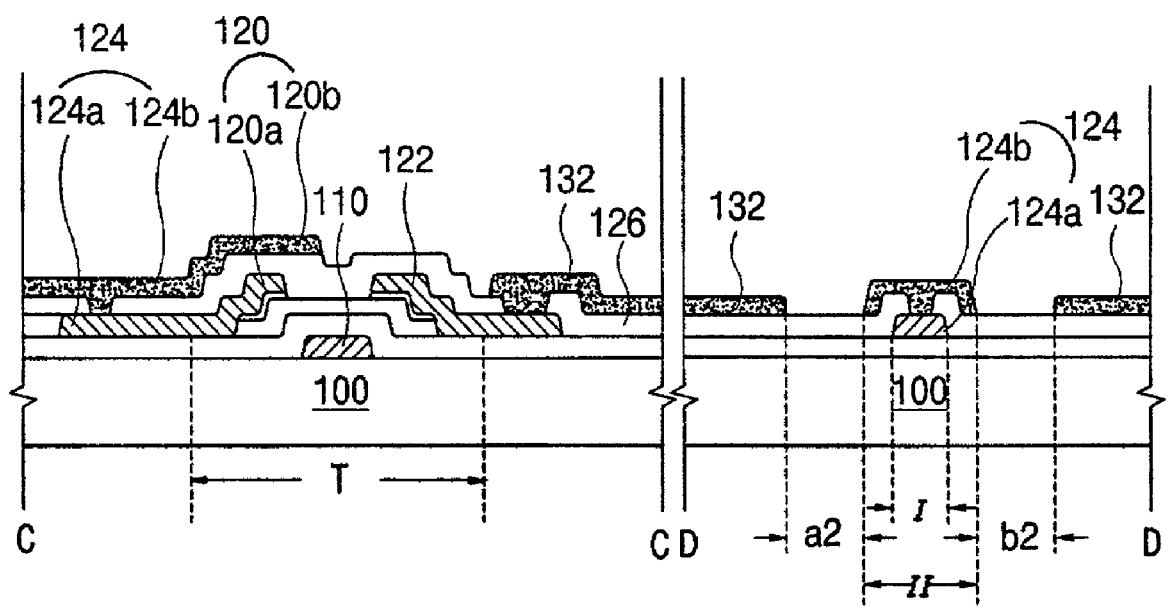

FIGS. 7A to 7C are cross-sectional views taken along C—C, D—D of FIG. 6, and illustrating an exemplary fabrication process for an array substrate according to the present invention.

In FIG. 7A, a gate electrode 110, a gate insulating layer 116 and a semiconductor layer 118 may be subsequently formed on a transparent substrate 100. A first source electrode 120a and a drain electrode 122 may be formed on the semiconductor layer 118, and the first source electrode 120a and the drain electrode 122 may be spaced apart from each other. A first data line 124a, which is connected to the first source electrode 120a, may be formed on the gate insulating layer 116. The gate electrode 110 may include a first material layer of at least aluminum neodymium (AlNd), for example, and a second material layer, which has a strong corrosion resistance to chemicals, of at least molybdenum (Mo), for example. The gate insulating layer 116 may be formed of a material suitable for low temperature processing such as silicon nitride ($SiN_x$), for example. The semiconductor layer 118 may include an active layer 118a, which may be formed of amorphous silicon, for example, and an ohmic contact layer 118b, which may be formed of doped amorphous silicon, for example. The first data line 124a, the first source electrode 120a, and the drain electrode 122 may be formed of a metal material including molybdenum (Mo), tungsten (W), chromium (Cr) and nickel (Ni), for example. The first data line 124a may be formed of a width smaller than a width of the second data line 124b. A channel "CH" may be formed by removing a portion of the ohmic contact layer 118 between the first source electrode 120a and the drain electrode 122, thereby exposing a portion of the active layer 118a.

In FIG. 7B, a passivation layer 126 may be formed on the first source electrode 120a, the drain electrode 122, and the first data line 124a. A plurality of drain contact holes 128 and data contact holes 130 may be formed through the passivation layer 126. The drain contact holes 128 and the data contact holes 130 expose portions of the drain electrode 122 and a portion of the first data line 124a, respectively. A shape, position, and total number of the data contact holes 130 may be diversely modified to form two data contact holes 130 in each pixel region, as shown in FIG. 6, for example. The passivation layer 126 may be formed of an insulating material such as silicon oxide ($SiO_2$), silicon nitride ($SiN_x$) or benzocyclobutene (BCB), for example.

In FIG. 7C, a pixel electrode 132, the second data line 124b, and a second source electrode 120b may be simultaneously formed on the passivation layer 126 using a transparent conductive material. The pixel electrode 132 may be connected to the drain electrode 122 through the drain contact hole 128 (of FIG. 7B). The second data line 124b and the second source electrode 120b may be connected to the first data line 124a and the first source electrode 120a through the data contact hole 130 (of FIG. 7B), respectively. The thin film transistor T includes the gate electrode 110, the first and second source electrode 120a and 120b and the drain electrode 122. A width "II" of the second data line 124b may be wider than a width "I" of the first data line 124a, where both edges of the second data line 124b may be disposed to cover outer side edges of the first data line 124a. Accordingly, forming the second data line 124b simultaneously with the pixel electrode 132 prevents creation of any overlay difference between the data line 124 and the pixel electrode 132. Moreover, both edges of the second data line 124b may be disposed to cover outer side edges of the first data line 124a to enable the second data line 124b to offset irregular overlay between the first data line 124a and the pixel electrode 132. The pixel electrode 132 may be connected to the thin film transistor T via the drain electrode 122. Since the drain electrode 122 may be formed independently of the data line 124 and thus does not affect a parasitic capacitance between the data line 124 and the pixel electrode 132, the drain electrode 122 may be formed with a single layer during the first data line 124a forming process. Accordingly, since the second data line 124b and the pixel electrode 132 are simultaneously formed during a same process, whereby the photolithographic masking for the second data line 124b and the pixel electrode 132 may be performed at a same time, the overlay difference between patterns may be improved. Specifically, as shown in FIG. 7C, a distance "a2" between the pixel electrode 132 on a left side and the data line 124 on a right side, and a distance "b2" between the pixel electrode 132 on a right side and the data line 124 on a left side can be kept uniform, thereby improving the overlay property.

It will be apparent to those skilled in the art that various modifications and variation can be made in the array substrate for liquid crystal display devices with the identification mark and the identification mark forming method of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
    a gate line;
    a gate insulating layer on the gate line;
    a data line on the gate insulating layer, the data line including a first data line having a first width and a second data line having a second width overlying an entire length of the first data line, the second width is larger than the first width;
    a passivation layer between the first data line and the second data line;
    a pixel electrode in a pixel region, the pixel region being defined by a crossing of the gate line and the data line, the pixel electrode being formed during a same process as the second data line, the pixel electrode being formed of the same material as the second data line; and
    a thin film transistor connected to the pixel electrode.

2. The device according to claim 1, further includes at least one data contact hole in each pixel region for connecting the first data line to the second data line.

3. The device according to claim 1, wherein the passivation layer is disposed on the thin film transistor.

4. The device according to claim 1, wherein the first data line includes at least one of molybdenum (Mo), tungsten (W), chromium (Cr), and nickel (Ni).

5. The device according to claim 1, wherein the second data line and the pixel electrode include at least a transparent conductive material.

6. The device according to claim 5, wherein the transparent conductive material includes at least indium tin oxide (ITO).

7. The device according to claim 1, wherein the thin film transistor includes the gate electrode, a first source electrode having a first width connected to the first data line, a second source electrode having a second width connected to the second data line, and a drain electrode spaced apart from the first source electrode.

8. The device according to claim 7, wherein the second source electrode is formed over the first source electrode.

9. The device according to claim 8, wherein the second width of the second source electrode is larger than the first width of the first source electrode.

* * * * *